Patented Nov. 29, 1949

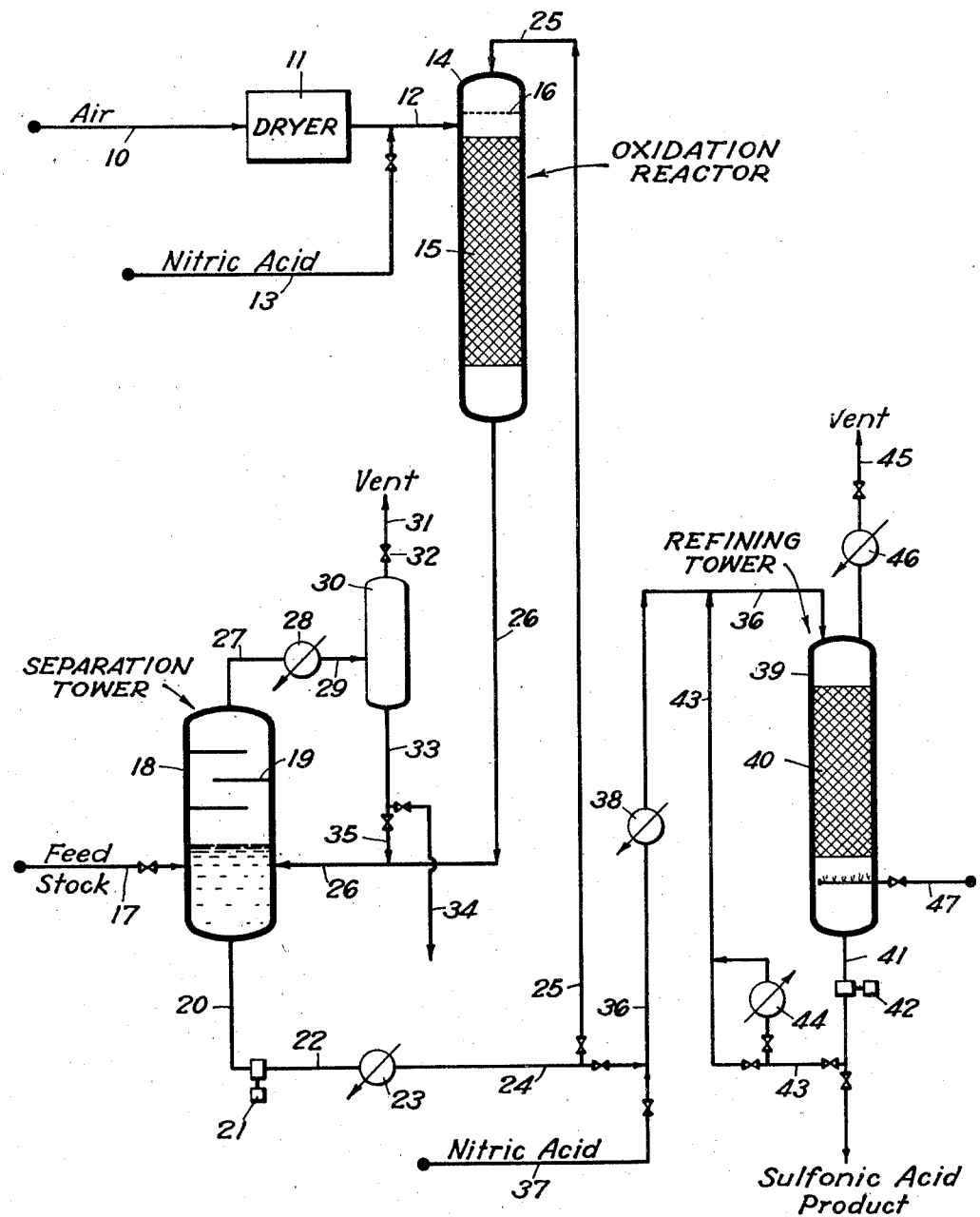

2,489,318

UNITED STATES PATENT OFFICE 2,489,318

ALKANE SULFONIC ACID MANUFACTURE

Wayne A. Proell, Chicago, Ill., assignor to Standard Oil Company, Chicago, Ill., a corporation of Indiana Application December 24, 1947, Serial No. 793,749

16 Claims. (Cl. 260—513)

This invention relates to an improved process for the production of organic sulfonic acids, particularly those in which the organic radical is a hydrocarbon radical. In applications for United States Letters Patent Serial Numbers 571,023, filed January 1, 1945, by W. A. Proell and B. H. Shoemaker and 590,841, filed April 28, 1945, by W. A. Proell, which have matured respectively into U. S. Letters Patent 2,433,395 and 2,433,396, are described novel processes for the production of organic sulfonic acids, particularly hydrocarbon sulfonic acids such as alkane-sulfonic acids. In the processes of said prior patents the charging stock is a sulfur compound conforming to the general formula $R_1S_nR_2$ wherein $R_1$ and $R_2$ are organic radicals, e. g. the same or different hydrocarbon radicals, S is sulfur, and $n$ is an integer having a value between 1 and 6, particularly symmetrical or asymmetrical alkyl disulfides. In the processes of said prior patents, said charging stocks are oxidized by a gas containing free oxygen and a catalyst selected from the group consisting of NO, $NO_2$, $N_2O_3$, $N_2O_4$ and $N_2O_5$, which may be generated in the reaction zone by nitric acid, which also functions to supply water to the reaction zone. The overall process applied, e. g., to a disulfide conforms to the equation:

although considerable evidence has been obtained that it proceeds through a rather large number of intermediate oxidation stages before sulfonic acids are produced.

This application is a C. I. P. of application for Letters Patent, S. N. 590,841 and is directed to an improvement in the processes thereof to yield sulfonic acids of superior quality by an improved, readily controllable operating procedure.

In the oxidation of a hydrocarbon disulfide, e. g. an alkyl disulfide by a gas containing free oxygen, e. g. air, in the presence of a catalytic quantity of a nitrogen oxide as mentioned above, oxygen is absorbed rapidly by the reaction mixture for a more or less extended initial period, depending on the specific feed stock and operating conditions. The rapid oxidation reaction results in the production of a mixture of two immiscible liquid phases, viz. sulfonic acid and unconverted hydrocarbon disulfide. As the reaction proceeds, the reactivity of the reaction mixture diminishes more or less rapidly as evidenced by reduced rate of oxygen absorption therein. As the oxidation proceeds the sulfonic acid concentration in the reaction mixture increases until a homogeneous mixture or solution of sulfonic acid and hydrocarbon disulfide is formed; at this juncture the reaction mixture is generally characterized by a markedly reduced rate of oxygen absorption compared with the disulfide charging stock. Thus, whereas under a given set of operation conditions (temperature, air rate through the reactor, charge rate through the reactor, pressure), the disulfide charging stock will absorb, say, 90–100% of oxygen from the oxidizing air stream, the solution of disulfide and sulfonic acid which is produced will, under the same operating conditions, absorb say, 30–40% of the oxygen from the air stream. Depending upon the charging stock, the formation of the

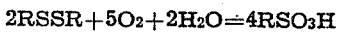

solution may coincide with $RSO_3H$ concentrations in the range of about 40–70 weight per cent in the solution.

It is possible in some cases to increase the rate of $O_2$ absorption of the $R_2S_2$—$RSO_3H$ solution by increasing the reaction temperature to a value above about 70° C., as described and claimed in S. N. 590,841. However, the employment of high temperatures in one or more secondary oxidation stages in most cases results in $RSO_3H$ which requires excessive bleaching by concentrated $HNO_3$ to produce acid of desirable color and color stability; in fact, the time spent in bleaching such acids frequently exceeds the time required to oxidize $R_2S_2$ charging stocks to form the crude $RSO_3H$.

However, I have now found that sulfonic acids of superior quality can be produced and coking and corrosion in the reaction zone may be minimized or avoided by maintaining the oxidation reaction temperature below about 125° F. Although at a temperature below about 125° F. the rate of oxygen absorption of $R_2S_2$—$RSO_3H$ is generally fairly low, over-oxidation of the reaction mixture is avoided with consequent avoidance of the production of dark-colored sulfonic acids of poor color stability which would require excessive bleaching treatment.

Moreover, the surprising fact has been demonstrated that individual alkyl disulfides such as methyl and ethyl disulfides are, upon oxidation with oxygen-containing gas and a nitrogen oxide catalyst, far more sensitive to temperatures above about 125° F. than a mixture of alkyl disulfides having about 2 to 6 carbon atoms in the molecule obtained by catalytic oxidation of the corresponding mercaptans obtainable from petroleum naphtha by extraction with caustic solutions (the so-called "Solutizer process"). When said oxidation process was applied to individual alkyl disulfides at temperatures which, in the latter part of the oxidation process, exceeded about 125° F., not only did the process yield sulfonic acids of dark color and poor color stability, but the product was otherwise undesirable in having high $H_2SO_4$, $H_2O$ and ash contents and therefore was fit only for certain low grade commercial uses. However, by the low temperature process (not in excess of 125° F.) herein described and claimed it has been possible for the first time to produce commercially desirable individual alkanesulfonic acids such as methane- and ethane-sulfonic acids having light color, good color stability; low $H_2O$, $H_2SO_4$, and low ash contents, in equipment exceeding laboratory scale, viz. in a reactor of 1 cubic foot capacity.

In a small-scale (laboratory) vertical oxidation tower I have found it feasible to counterflow liquid disulfide charging stock downwardly against an air stream containing a nitrogen oxide catalyst. However when this method was tested in a larger reaction tower having a volume of about 1 cubic foot, seemingly insuperable difficulties were encountered which resulted in the abandonment of the tower oxidation method and in the alternative and less desirable use of kettles or autoclaves. These difficulties were, in the main, lack of adequate temperature control which in turn resulted in coking and corrosion of the reaction tower and discoloration and deterioration of the $RSO_3H$ product, and flooding of the reaction tower. These difficulties in the tower oxidation method appeared insuperable until concurrent downflow of liquid disulfide charging stock oxidizing gas and nitrogen oxide catalyst through the tower was found to result in their substantial elimination. The most practical and unexpectedly effective method, therefore, of operating the low temperature (not in excess of 125° F.) oxidation process of the present invention is the concurrent downflow method just described. Although the low temperature oxidation process of the present invention may also be effected in autoclaves, pipe coils, etc., it should be emphasized that by the employment of downflow concurrent contacting of gas and liquid in the reactor and by not allowing the reaction temperature to exceed about 125° F., the oxidation operation has been transformed from an erratic operation requiring strict supervision and sensitive control, to a relatively simple operation requiring a minimum of operating skill and far less stringent supervision. The tendency toward runaway temperatures (which may lead to ignition) is avoided by use of concurrent flow.

In order to describe the present invention with more particularity, reference is made at this point to the figure, which is a schematic flow diagram indicating suitable reaction equipment for effecting the present process.

Although charging stocks conforming to the general formula $R_1S_xR_2$ (supra) can be employed, the process will be described in its application to hydrocarbon disulfides such as alkyl disulfides. Suitable charging stocks are individual alkyl disulfides or mixtures thereof. Preferred alkyl disulfides contain at least one primary or secondary alkyl group. Properties of representative alkyl disulfide charging stocks are set forth in Table I below.

*Table I*

| Disulfides | A. S. T. M. Distillation, °F. | | | | | | | Sp. Gr. | Reid Vapor Pressure |
| --- | --- | --- | --- | --- | --- | --- | --- | --- | --- |
| | Initial | 10% | 30% | 50% | 70% | 90% | Max. | | |
| Methyl | 225 | 226 | 227 | 227 | 228 | 229 | 298 | 1.050 | |
| Ethyl | 298 | 304 | 304 | 305 | 305 | 305 | 312 | 1.005 | 0.7 |
| Mixed [1] | 267 | 288 | 300 | 307 | 315 | 328 | 356 | 0.990 | 0.3 |

[1] A mixture of symmetrical and asymmetrical alkyl disulfides having 2 to 7 carbon atoms, inclusive, in the molecule; obtained by steam distillation of disulfides derived from caustic extraction of a petroleum naphtha followed by oxidation of the caustic extract. This mixture is essentially free of naphtha, phenolic materials and polysulfides. The average m. wt. is about 122, corresponding to $Et_2S_2$.

The oxidizing agent employed in the present process is a gas containing free oxygen. Commercially, air is the preferred oxidizing agent, but other gases containing free $O_2$ may be employed, such as flue gases containing $O_2$, $O_2$-enriched air, etc.

The oxidation catalyst is a nitrogen oxide as described above. In general, it is necessary to introduce with the feed stock less than 10% by weight of nitrogen oxides based on the total oxygen absorption, and usually I introduce about 1 to about 5% by weight of nitrogen oxide based on the oxygen consumed.

Commercially, it is preferred to employ nitric acid as a source of nitrogen oxide catalyst. Nitric acid, thus employed, serves also as a source of water required for the production of $RSO_3H$, as indicated by the equation (supra). A nitrogen oxide such as $NO_2$, 70 weight per cent nitric acid and 91 weight per cent nitric acid have been employed in the present oxidation process, indicating that the nitric acid concentration is not of critical importance. Two factors determine the minimum desirable catalyst rate: (1) The amount of nitric acid in the liquid reactants should be sufficient to promote rapid absorption and utilization of oxygen; (2) the nitric acid concentration must be above a certain minimum to prevent corrosion of steel and other metal parts in the reaction equipment. Rapid attack of 18-8 stainless steel reaction equipment has been observed when the reducing capacity of the disulfide charging stock has been in excess of the oxidation capacity of the amount of $O_2$ and nitrogen oxide catalyst. It has been observed that the concentration of nitric acid necessary to insure smooth oxidation of akyl disulfide charging stocks is greater than the amount needed for corrosion protection of steel reaction equipment.

As has been pointed out above, water is a necessary reactant for the production of sulfonic acids from disulfides, or for that matter from polysulfides. It has been observed that even when the oxidation of an alkyl disulfide is effected under conditions wherein the initial entrance of water into the reaction system is rigidly excluded, some water is formed in the reactor by oxidation of alkyl radicals, resulting in the formation of a mixture of sulfonic acid and sulfonic anhydrides (S. N. 702,989—W. A. Proell, filed October 12, 1946). Moreover, when nitric acid has been employed both as the source of catalyst and as the sole source of free water in the reaction zone, the employment of nitric acid in an amount insufficient to furnish the theoretically required amount of H₂O has not led to difficulties; in fact, as will be pointed out hereinafter in connection with a specific example, the sulfonic acid produced under these conditions contained free water. Generally, however, it is desirable, in the present process, that little or no free water be added to the reaction zone, except for that in the nitric acid solution. In cases where little or no water is introduced with the catalyst it may be desirable to add water to the extent of about 1 to 20% by weight based on disulfides charged, the addition being regulated to yield acids of about 95 to 100% concentration.

In the event that the plant schematically illustrated in the figure were scaled to produce about 2 tons/24 hour day of mixed alkanesulfonic acids in a batch reaction system employing a reaction period of about 36 hours per batch, the reactor would be a stainless steel drum having an I. D. of about 3 feet and being about 20 feet high, suitably packed, e. g. with ½ inch Raschig rings through a height of 16 feet. Air would be passed through line 10 into a suitable dryer 11 at a rate sufficient to discharge 26,000 S. C. F./hour of air 50% saturated at 100° F. into line 12. Nitric acid (70 weight per cent; about 28-30 lbs./hr.) would be passed through valved line 13 into line 12 and intimately mixed with the air by suitable means (not shown). The resulting spray or intimate mixture is discharged under pressure into reactor 14 provided, as mentioned, with suitable packing material 15 and a liquid distributor plate 16. The air-catalyst stream preferably enters the reactor at a point between the liquid distributor plate 16 and packing 15, but it may be introduced at any point between pump 21 and tower 15.

Alkyl disulfide feed stock is charged through valved line 17 below the liquid level in separating drum 18 which is suitably provided with baffle plates or screens 19, or equivalent liquid deentrainment devices. The feed stock (added in quantity for a 36 hour batch operation—about 3650 lbs.) passes from drum 18 through line 20 into pump 21, suitably a centrifugal pump, thence through line 22 into an indirect heat exchanger 23. During the starting-up period, hot water is circulated through the tubes of heat exchanger 23 to heat the disulfide feed stock to a temperature of about 95-100° F.

Sufficient heat is removed from the circulating reaction mixture in heat exchanger 23 to prevent the temperature of the mixture in reactor 14 from exceeding about 125° F. Usually, the partially oxidized products are cooled to a temperature between about 60° F. and about 90° F. For the purpose of the present example, the cooler would be a shell and tube heat exchanger, through which the disulfide oil would be circulated through the shell side at the rate of about 241,000 lbs./hr., entering line 22 at a temperature of about 105° F. and leaving cooler or heat exchanger 23 through line 24 at the temperature of 92° F. Water is circulated in the cooler through tubes, the water entering at 75° F. and leaving at 85° F., for removing the required amount of heat, which may be about 1170 M. B. t. u./hr., from the circulating reaction mixture.

The feed stock or circulating reaction mixture passes from line 24 through valved line 25 into the upper end of reactor 14 at a point above the liquid distributing tray or grid 16 positioned therein, passes through said grid, mixes with entrant air and nitric acid and passes downwardly through the packing material 15 in the reactor. The reactor is designed to operate at 50 p. s. i. g. The oxidation reaction which occurs in the reactor is, of course, exothermic; consequently, a temperature increase of about 25 to 30° F. occurs in the reactor contents from the top to the bottom of the reactor. About 140,000 B. t. u. are disengaged per pound mol of O₂ absorbed. In the present example the temperature at the reactor top will be about 92° F. and at the bottom, about 105° F. About 1½ to 2 minutes are required to circulate the disulfide charge through the reactor. Only a very small fraction of the total oxidation occurs in one passage of the reaction mixture through the reactor. Consequently, it is possible to maintain careful control of the reaction temperature.

From the lower end of reactor 14, the partially oxidized feed stock, together with partially spent air and catalyst, leaves through line 26 and passes into separating drum 18. In drum 18, gases are separated from the liquid partially oxidized reaction mixture and pass over deentrainment baffles 19, through line 27 into condenser 28. In condenser 28, vapors of water and unreacted disulfide are condensed from the gaseous stream of partially spent air and nitrogen oxides. The liquid-gaseous mixture leaves condenser 28 through line 29 and passes into drum 30, whence gases are vented through line 31 containing a back pressure valve 32 which controls the pressure in the reaction system. Liquids accumulating in drum 30 may be vented wholly or in part through line 33 and valved line 34, but it is preferred to pass at least a portion of the liquids through valved line 35 for recycle to line 26 and thence to drum 18 for recycle to reactor 14.

The partially oxidized liquid reaction mixture is withdrawn from the lower end of separating drum 20 for recycle to the reactor as described above. In this way, oxidation of the charging stock is carried to substantial completion, with sulfonic acid yields of 90% of the theoretical or even more.

In a typical oxidation cycle employing air as the oxidant and HNO₃ catalyst, the disulfied is charged into the unit through line 17, the circulating pump 21 is started and the charge is heated in heat exchanger 23 to a temperature of about 95-100° F. by indirect heat exchange with hot water. Then the air feed to reactor 14 through line 12 is started at a low rate and the HNO₃ catalyst is metered through line 13 into the air stream under pressure. The pressure in reactor 14 is adjusted to 5 p. s. i. g. by proper setting of valve 32 and is held there until the induction period is over and the reaction begins. Usually about 1 hour is allowed for the induction period, although noticeable oxygen absorption occurs in ½ hour. After the induction period, the pressure is raised to about 50 p. s. i. g. and the air rate is increased to the maximum which can be held without exceeding a temperature of about 125° F. at the bottom of reactor 14. The air rate is then held at this value for about 13 hours (in the case of a mixture of alkyl disulfides containing 2-6 carbon atoms, inclusive, in the molecule) and the catalyst rate is held constant at a value of about 1.2 mol per cent HNO₃ in the air feed. The oxygen removal from the air stream ("cleanup") varies from about 90% to about 100% during the initial rapid oxidation reaction, but as the reaction proceeds, the reactivity of the material in process diminishes more or less rapidly, resulting in a decrease in oxygen cleanup from the air stream. It has been observed that over 80% of the oxidation reaction may be completed during the initial rapid reaction. When the oxygen cleanup drops to about 30–40%, the air rate to the reactor is reduced, the rate of nitric acid injection is maintained to give 2–3 mol per cent $HNO_3$ in the entering air, and the reaction is completed by about 20 hours of operation at this rate. The product is ready for final refining operations when the reaction mixture becomes entirely water soluble. It is preferred to hold the reactor tower bottoms temperature at about 95 to about 105° F. throughout the run, except during the initial period of rapid oxidation, when it may reach about 115° F. to about 120° F. but should not for any substantial length of time exceed a temperature of about 125° F. The liquid circulation rate through the reaction system is desirably maintained constant throughout the run.

A typical crude mixture of alkanesulfonic acids produced by the process just described will contain about 1 to about 3 weight per cent $H_2O$; about 1.5 to about 3 weight per cent $H_2SO_4$; ash in trace amounts to less than about 0.01 weight per cent; are amber to red in color as contrasted to the black color characteristic of crude acids which have been at least partially decomposed by exposure to high temperatures in excess of about 125° F.

Although the alkanesulfonic acids produced directly by the catalytic oxidation process are suitable for many purposes with little or no refining, it is desirable to practice some refining upon the crude sulfonic acids in order to fit them better for certain specialized uses. To this end, the crude sulfonic acid product finally separated in drum 18 and having a sulfonic acid concentration of at least about 90 weight per cent, is passed through line 20 and forced by pump 21 through line 22 and heat exchanger 23, thence through line 24 into valved line 36. The crude sulfonic acid in line 36 is joined by a stream of fuming nitric acid entering through valved line 37. Usually, between about 5 and about 10 weight per cent of about 91 weight per cent nitric acid is slowly added to the crude sulfonic acid and passed through cooler 38 to avoid local overheating to temperatures higher than about 140° F. Nitric acids having concentrations between about 60 and about 100 weight per cent may be employed in the refining operation, suitable quantities being employed to achieve the desired extent of refining.

The mixture of crude sulfonic acid and $HNO_3$ passes into the refining tower 39 at its upper end and passes downwardly over suitable packing material 40 into the bottom of the tower, whence it is recirculated through line 41 and pump 42 through valved line 43 and line 36 to the top of the refining tower. The temperature of the circulating liquid stream is controlled by suitably proportioning its flow through a by-pass heat exchanger 44 in line 43. Refining tower 39 is also provided with an overhead valved vent line 45 containing a knockback condenser 46.

The mixture of crude sulfonic acid and nitric acid is circulated through the refining tower at about 140° F. for 4 hours, maintaining a sufficiently high liquid circulation rate through the tower to prevent local overheating. Then the temperature of the circulating liquid stream is increased to about 200° F. by passage through heat exchanger 44 and maintained for about 6 hours. At this point the color of the sulfonic acid product has lightened considerably. About 3 to 5 weight per cent of 91% nitric acid is added to the circulating liquid stream and air or other inert gas such as $N_2$, $CO_2$, flue gas, etc. is introduced through valved line 47 into tower 39 to remove nitrogen oxides absorbed in the sulfonic acid. Suitable stripping temperatures are between about 180 and about 240° F., e. g. 200° F. Stripping of the sulfonic acid is continued until the sulfonic acid product gives a negative $FeSO_4$ test for nitrates.

In place of the refining tower illustrated in the figure, it will be evident that an autoclave provided with heat exchange coils could be employed; agitation in such an autoclave could be produced by bubbling air or other inert gas through the liquid or by the use of a mechanical agitator.

If desired, the nitric acid refining procedure may be repeated; it may also be followed by contacting the sulfonic acid with adsorbents such as charcoal, preferably after dilution of the sulfonic acid with water, e. g. to an acid concentration of 35–45 weight per cent.

Stainless steel (types 302 and 304) has proved satisfactory in service on an oxidation plant as illustrated in the figure, provided care was taken to avoid reducing conditions by providing uninterrupted flow of nitric acid catalyst and air into the system before oxidation is complete. It has also been observed that corrosion is prone to occur in locations where liquid stagnates, as in pump seals. Worthite, an alloy steel containing 23–25% nickel, 19–21% chromium, 3% molybdenum, 3.25% silicon, 1.75% copper, .6% manganese, and less than .07% carbon, has exhibited markedly superior corrosion resistance under reducing conditions in contact with a mixture of alkyl disulfides and alkanesulfonic acids containing 1 to 4 carbon atoms in the molecule at 210° F. for 17 hours. Under these conditions, Worthite was corroded at the rate of 0.006 inch per year, compared e. g. with 2.96 inches per year for type 304 stainless steel.

In Table 2 are presented the operating conditions for a series of batch runs in which various alkyl disulfides were oxidized by concurrent downflow with air and nitric acid through a vertical stainless steel (type 304) reactor having a volume of 1 cubic foot (3.8 inch I. D. by 10′ long) packed with ½ inch Berl saddles and provided near its upper end with a liquid distributing plate, as shown in the figure. The remainder of the oxidation reaction equipment was set up for flow as shown in the figure. A $CaCl_2$ air dryer was employed. The liquid circulation rate through the reactor was maintained substantially constant at 5 gal./min.; this circulation rate results in the passage of 3600 gals. per hour per square foot of reactor cross section and usually results in a temperature rise through the reactor of about 20° F. due to the heat liberated by the reaction. Nitric acid (70 weight per cent) was metered into the air stream. During the induction period (approximately 1 hour), the pressure in the oxidation reactor was maintained at about 5 p. s. i. g.; upon the onset of rapid oxygen absorption in the circulating liquid reaction mixture, the pressure was increased to 50 p. s. i. g. The only intentional addition of free water to the reactor was in the 70 weight per cent nitric acid employed as the source of nitrogen oxide catalysts.

was maintained for four hours. Then the temperature of the acid was increased to 200° F. and Table 2

| Run No. | 1 | 2 | 3 | 4 | 5 |
|---|---|---|---|---|---|
| Alkyl Disulfide Feed Stock | Ethyl | Ethyl | Methyl | Mixed [1] | Mixed.[1] |
| Temp. °F.: Mean [2] | 90–100 | 90–100 | {70–95 [3] / 85 [4]} | 95–100 | 90–100. |
| Max. at Reactor Btm | 106 | 142 [5] | 102 | 103 | 114. |
| Air Rate, S. C. F./hr. (at hours on stream) | {30 (initial) / 200 (1–10) / 140 (10–28½)} | {50 (initial) / 250 (1½–19½) / 100 (19½–24½)} | {0–50 (initial) / 250 (2–6½) / 100 (6½–28½)} | {30 (initial) / 200 (1–10) / 140 (10–28)} | {50 (initial) / 250 (½–16½) / 100 (16½–32).} |
| Reaction time, hours | 28½ | 24½ | 28½ | 28 | 32. |

[1] A mixture of alkyl disulfides having the specifications set forth in Table 1.
[2] Average of temps. at temps. at top and bottom of reactor through the run.
[3] During initial stage of rapid oxygen absorption.
[4] During secondary stage of slow oxygen absorption.
[5] Represents a temperature surge of short duration; throughout substantially the entire run the temp. was closely confined to the range of 90 to 100° F.

Table 3

| Run No. | 1 | 2 | 3 | 4 | 5 |
|---|---|---|---|---|---|
| Alkyl disulfide charge | Ethyl | Ethyl | Methyl | Mixed | Mixed |
| *Material Balance* | | | | | |
| disulfide charge, lbs | 61.0 | 80.0 | 31.3 | 64.0 | 80.0 |
| total oxygen consumed from air, lbs | 41.7 | 56.6 | 26.6 | 28.4 | 60.0 |
| water from nitric acid, free and combined, lbs | 6.35 | 6.27 | 9.82 | 6.99 | 6.16 |
| oxygen from $HNO_3$ decomposition, lbs | 1.40 | 1.38 | 2.16 | 1.54 | 1.36 |
| total consumption, lbs | 110.45 | 144.25 | 69.88 | 100.93 | 147.52 |
| sulfonic acid product, lbs | 104.25 | 120.00 | 60.00 | 102.82 | 135.00 |
| Weight per cent recovery | 94.5 | 83.20 | 85.9 | 101.8 | 92.00 |
| *Oxygen Consumption* | | | | | |
| total air into reactor, lbs | 343.0 | 394.0 | 275.0 | 332.0 | 422.0 |
| total oxygen into reactor, lbs | 79.0 | 90.5 | 63.3 | 76.4 | 97.1 |
| total oxygen consumed, lbs | 41.7 | 56.6 | 26.6 | 28.4 | 60.0 |
| overall oxygen cleanup, per cent | 52.8 | 60.0 | 41.0 | 37.2 | 61.7 |
| *Nitric Acid Consumption* | | | | | |
| nitric acid (70 weight per cent) consumed, lbs | 15.8 | 15.6 | 24.4 | 17.4 | 22.3 |
| overall mol per cent $HNO_3$ in entering air | 1.6 | 1.27 | 2.85 | 1.68 | 1.70 |
| *Product Analysis* | | | | | |
| Before Bleaching: | | | | | |
| water, weight per cent | −0.526 | −0.41 | | 2.85 | 0.88 |
| $H_2SO_4$, weight per cent | 1.027 | 0.96 | | 2.22 | 1.96 |
| $RSO_3H$, weight per cent | 98.9 | 99.6 | | 93.0 | 92.20 |
| Ash, weight per cent | 0.01 | 0.007 | | 0.008 | trace |
| After Bleaching: | | | | | |
| Water, weight per cent | 1.41 | 1.89 | 2.99 | 3.88 | 3.22 |
| $H_2SO_4$, weight per cent | 0.92 | 1.37 | 1.85 | 2.46 | 2.43 |
| $RSO_3H$, weight per cent | 98.4 | 96.2 | 92.40 | 93.40 | 93.0 |
| Ash, weight per cent | 0.02 | 0.02 | 0.02 | 0.015 | 0.02 |
| Color, N. P. A | 1–1.5 | 1 | 1–1.5 | 2.5 | 2–2.5 |
| Color after 3 hrs. at 210° F., N. P. A | 1.5 | 1–1.5 | 1–1.5 | 3 | 3 |

The material balances, oxygen consumption, nitric acid consumption and product analyses obtained by the operations summarized in Table 2 are presented in Table 3.

The bleaching operation referred to in Table 3 was carried out in a stainless steel tank provided with a coil for heating or cooling and an air dispenser. The crude sulfonic acids were charged to the tank and 5 to 8 weight per cent of 91% white fuming nitric acid was added slowly while cooling to maintain the temperature below 140° F. Mixing was accomplished by bubbling a small volume of air thru the acid. After mixing, the acid was heated to 140° F., which temperature held for six hours. Then about 3 to 5 weight per cent of 91% nitric acid was added and the acids were stripped with air at about 200° F. employing an air rate of 175 S. C. F./hr. until the $FeSO_4$ test applied to sulfonic acid samples was negative. Stripping usually occupied from about 20 to 30 hours.

In Table 3, the negative $H_2O$ contents of the crude sulfonic acids produced in runs 1 and 2 indicate that no free water was present in the sulfonic acid products, but that they reacted with $H_2O$ to the extent indicated. The negative $H_2O$ values indicate the presence of sulfonic anhydride in the crude reaction products. Thus, the negative water value in run 1 would indicate that the crude ethanesulfonic acid product contains approximately 6 weight per cent of ethanesulfonic anhydride.

A water balance on the various runs set forth in Table 3 shows that from 120 to 150 weight per cent of the water charged is recovered as free and chemically combined water in the product. Although less free water than was theoretically required has been added to the reactor during the oxidation process, free water has been recovered in some of the crude sulfonic acid products. For example, in run 4, the amount of water required by theory to be added to the reactor is 9.6 lbs. Although only 6.99 lbs. of water were added, the crude sulfonic acid product contained 2.85 weight per cent of free water.

The data presented in Table 3 are essentially self-explanatory. From the data it will be noted that the process of the present invention renders possible the consistent production of sulfonic acids in high yields. The sulfonic acid products are, moreover, characterized by their uniformly low contents of impurities and by their light color. The retention by the sulfonic acid products of light color after being heated for three hours at 210° F. is evidence of their good color stability.

In contrast to the results obtained in the present low-temperature oxidation process, a typical mixed alkanesulfonic acid product derived from a process differing from that of the invention by employing temperatures above 125° F. to accelerate oxidation in the second (slow oxygen absorption) stage had the following properties:

| | | |
|---|---|---|
| $RSO_3H$ (110 m. w.) | weight per cent | 90 |
| $H_2SO_4$ | do | 3 |
| $H_2O$ | do | 4 |
| Ash | do | 0.02 |
| Sp. gr. | | 1.37 |
| Color, N. P. A. | | 4 |
| Color after 3 hours at 210° F., N. P. A. | | 7 |

The material balances obtained in runs 1 to 5 are considered good in view of the relatively small size of reaction system and in view of some mechanical difficulties causing leakage from the equipment.

Although certain specific embodiments of the present invention have been detailed, it should be understood that the inventive concept is not limited thereto. Thus, although I prefer to conduct the oxidation at temperatures between about 90° F. and about 110° F., the oxidation can generally be conducted at temperatures between about 20° F. and about 125° F. With some charging stocks, temperatures as high as about 150° F. may be used, e. g. temperatures in the range of about 50 to about 150° F. Although the oxidation runs described above were conducted at the reactor pressure of 50 p. s. i. g., other runs have been carried out at atmospheric pressure. During the initial stages of oxidation in which oxygen is absorbed very rapidly by the liquid reaction mixture, it is advantageous to maintain a high concentration of oxygen in the reactor; this may be effected, e. g., by employing air enriched with free oxygen or by employing air or other oxidizing gas stream under pressure. Air enriched to 60% oxygen content has been employed to accelerate the oxidation of alkyl disulfides at atmospheric pressure; air has also been employed in this process at 75 p. s. i. g. Since, at least during the stage of rapid oxidation, the effect of pressure is to increase the rate of oxidation of the charging stock, the true upper limitation on the pressure at which the reaction can be conducted appears to be limited by simply the rate at which heat can be removed from the reaction mixture to prevent its temperature from increasing above about 125° F. Explosions may occur if the initial oxidation is conducted under high pressure with air and it becomes impossible to remove the heat of reaction at a sufficiently rapid rate.

Although the maximum air rate employed in the runs specifically detailed above was 250 S. C. F./hr., much higher air rates could probably be employed in a larger reactor or one provided with sufficient heat removal means. Since, in the present process, the flow of liquid and gas through the reactor is concurrently downward, the danger of reactor flooding at high gas velocities is practically eliminated. After the oxidation reaction enters the secondary stage characterized by slow oxygen obsorption in a one-phase liquid reaction mixture, it is usually desirable to reduce the air rate in order to (1) conserve power, (2) reduce the small amounts of water which enter the reactor with the air stream, (3) reduce catalyst removal from the reactor by the partially spent air stream, and (4) increase the residence time of oxygen in the reactor.

One reaction tower has been depicted in the figure for effecting the entire oxidation process. However, two or even more reaction towers may be employed. Thus, the rapid oxidation stage can be effected in a reaction tower having internal or associated heat removal facilities capable of rapidly removing large quantities of heat; the second or slow oxidation stage can be effected in a smaller tower which would not require such extensive heat removal facilities as the first reaction tower. The first reaction tower would be operated under relatively high superatmospheric pressure, e. g. 50–100 p. s. i. g., whereas the second tower might be operated at about 0–25 p. s. i. g.

Preferably the reaction should be effected with a sufficiently dry charging stock and a sufficiently low amount of water introduced with the catalyst so that during the latter part of the reaction the amount of water present does not substantially exceed 1% by weight based on introduced disulfides. Greater water tolerance is permissible in the initial stages of the oxidation, the limitation of the amount of water of less than about 1% being particularly important after the homogeneous phase conditions are reached. Exceeding this water limit results in a retarded reaction rate.

Numerous variations of the inventive process will readily suggest themselves to one skilled in the art, such as the conversion of the batch process herein decribed to a semi-continuous or continuous basis, etc.

Having thus described my invention, what I claim is:

1. The process for producing a sulfonic acid which comprises oxidizing a hydrocarbon disulfide by passing said disulfide, a gas containing free oxygen, and a catalytic quantity of a nitrogen oxide selected from the group consisting of NO, $NO_2$, $N_2O_3$, $N_2O_4$ and $N_2O_5$, downwardly in concurrent contact through a vertical reaction zone at a temperature not exceeding about 125° F., and continuing the oxidation until more than 90 percent by weight of said disulfide has been oxidized.

2. The process of claim 1 which includes the additional steps of removing a partially oxidized product from the lower end of said vertical reaction zone, cooling said partially oxidized product to an oxidation reaction temperature not in excess of about 90° F. and recycling the cooled partially oxidized product to the upper end of said vertical reaction zone.

3. The process for producing an alkanesulfonic acid which comprises oxidizing a disulfide having the formula $R_1SSR_2$ wherein $R_1$ and $R_2$ are alkyl radicals having 1 to 6 carbon atoms and at least one of said radicals is selected from the class consisting of primary and secondary radicals, which process comprises passing said disulfide and a gas containing both free oxygen and a catalytic quantity of a nitrogen oxide selected from the group consisting of NO, $NO_2$, $N_2O_3$, $N_2O_4$ and $N_2O_5$ downwardly in concurrent contact through a vertical reaction zone at an oxidation reaction temperature.

4. The process for producing a sulfonic acid from an organic sulfur compound having the formula $R_1S_nR_2$ wherein $R_1$ and $R_2$ are hydrocarbon radicals and $n$ is an integer having a value between 1 and 6, which process comprises passing said sulfur compound, a gas containing free oxygen, and a catalytic quantity of a nitrogen oxide selected from the group consisting of NO, $NO_2$, $N_2O_3$, $N_2O_4$ and $N_2O_5$, downwardly in concurrent contact through a vertical reaction zone at a temperature not exceeding about 125° F., and continuing the oxidation until more than 90 percent by weight of said sulfur compound has been oxidized.

5. The process for producing a sulfonic acid which comprises passing a hydrocarbon disulfide, a gas containing free oxygen and a catalytic quantity of a nitrogen oxide selected from the group consisting of NO, $NO_2$, $N_2O_3$, $N_2O_4$ and $N_2O_5$, downwardly in concurrent contact through a vertical reaction zone at a temperature between about 90° F. and about 125° F., removing a partially oxidized product from the lower end of said vertical reaction zone, cooling said partially oxidized product to a temperature between about 60° F. and about 90° F., recycling the cooled, partially oxidized product to the upper end of said vertical reaction zone, and continuing the oxidation until more than 90 percent by weight of said disulfide has been oxidized.

6. The process for producing an alkanesulfonic acid from a disulfide having the formula $R_1SSR_2$ wherein $R_1$ and $R_2$ are alkyl radicals having 1 to 6 carbon atoms and at least one of said radicals is selected from the class consisting of primary and secondary radicals, which process comprises passing said disulfide, a gas containing free oxygen and a catalytic quantity of nitric acid downwardly in concurrent contact through a vertical reaction zone at a temperature between about 20° F. and about 125° F., removing a partially oxidized product from the lower end of said vertical reaction zone, cooling said partially oxidized product to a temperature between about 60° F. and about 90° F., recycling the cooled partially oxidized product to the upper end of said vertical reaction zone, and continuing the oxidation until more than 90 percent by weight of said disulfide has been oxidized.

7. The process for producing an alkanesulfonic acid from a disulfide having the formula $R_1SSR_2$ wherein $R_1$ and $R_2$ are alkyl radicals having 1 to 6 carbon atoms and at least one of said radicals is selected from the class consisting of primary and secondary radicals, which process comprises passing said disulfide, a gas containing free oxygen, water in an amount substantially less than the amount theoretically required, and a catalytic quantity of nitric acid downwardly in concurrent contact through a vertical reaction zone at a temperature between about 20° F. and about 125° F., removing a partially oxidized product from the lower end of said vertical reaction zone, cooling said partially oxidized product to a temperature between about 60° F. and about 90° F., recycling the cooled partially oxidized product to the upper end of said vertical reaction zone, and continuing the oxidation until more than 90 percent by weight of said disulfide has been oxidized.

8. A process for producing an alkanesulfonic acid from a disulfide having the formula $R_1SSR_2$ wherein $R_1$ and $R_2$ are alkyl radicals having 1 to 6 carbon atoms and at least one of said radicals is selected from the class consisting of primary and secondary radicals, which process comprises passing said disulfide, a gas containing free oxygen, and a catalytic quantity of a nitrogen oxide selected from the group consisting of NO, $NO_2$, $N_2O_3$, $N_2O_4$ and $N_2O_5$, downwardly in concurrent contact through a vertical reaction zone at an oxidation reaction temperature not exceeding about 125° F., and maintaining the amount of water present in the reaction mixture below about 1 percent by weight based on disulfide charged to said reaction zone during that portion of the reaction period in which the reaction mixture consists essentially of a homogeneous solution of said disulfide and said alkanesulfonic acid.

9. The process for producing a sulfonic acid from an organic sulfur compound having the formula $R_1S_nR_2$ wherein $R_1$ and $R_2$ are hydrocarbon radicals and $n$ is an integer having a value between 1 and 6, which process comprises passing said sulfur compound, a gas containing free oxygen, and a catalytic quantity of $NO_2$ downwardly in concurrent contact through a vertical reaction zone at a temperature between about 20 and 125° F., and continuing the oxidation until more than 90 percent by weight of said sulfur compound has been oxidized.

10. The process for producing a sulfonic acid from an organic sulfur compound having the formula $R_1S_nR_2$ wherein $R_1$ and $R_2$ are hydrocarbon radicals and $n$ is an integer having a value between 1 and 6, which process comprises passing said sulfur compound, a gas containing free oxygen, and a catalytic quantity of nitric acid downwardly in concurrent contact through a vertical reaction zone at a temperature between about 20 and 125° F., and continuing the oxidation until more than 90 percent by weight of said sulfur compound has been oxidized.

11. The process of claim 10 wherein the organic sulfur compound is a hydrocarbon disulfide.

12. The process for producing a sulfonic acid from an organic sulfur compound having the formula $R_1S_nR_2$ wherein $R_1$ and $R_2$ are hydrocarbon radicals and $n$ is an integer having a value between 1 and 6, which process comprises passing said sulfur compound, a gas containing free oxygen, and a catalytic quantity of a nitrogen oxide selected from the group consisting of NO, $NO_2$, $N_2O_3$, $N_2O_4$ and $N_2O_5$, downwardly in concurrent contact through a vertical reaction zone at an oxidation reaction temperature.

13. The process of claim 12 wherein the organic sulfur compound is a hydrocarbon disulfide.

14. The process of claim 12 which includes the additional steps of removing a partially oxidized product from the lower end of said vertical reaction zone, cooling said partially oxidized product, and recycling the cooled, partially oxidized product to the upper end of said reaction zone.

15. The process of claim 14 wherein the organic sulfur compound is a hydrocarbon disulfide.

16. The process for producing an alkanesulfonic acid from a disulfide having the formula $R_1SSR_2$ wherein $R_1$ and $R_2$ are alkyl radicals having 1 to 6 carbon atoms and at least one of said radicals is selected from the class consisting of primary and secondary radicals, which process comprises passing said disulfide, a gas containing free oxygen, water in an amount between about 1 and about 20 weight percent based on said disulfide, and a catalytic quantity of a nitrogen oxide selected from the group consisting of NO, $NO_2$, $N_2O_3$, $N_2O_4$ and $N_2O_5$, downwardly in concurrent contact through a vertical reaction zone at a temperature between about 20° F. and about 125° F., and continuing the oxidation until more than 90 percent by weight of said disulfide has been oxidized.

WAYNE A. PROELL.

REFERENCES CITED

The following references are of record in the file of this patent:

UNITED STATES PATENTS

| Number | Name | Date |
| --- | --- | --- |
| 2,433,395 | Proell & Shoemaker | Dec. 30, 1947 |
| 2,433,396 | Proell | Dec. 30, 1947 |